United States Patent Office 2,826,560
Patented Mar. 11, 1958

2,826,560

DYEABLE ACRYLONITRILE COPOLYMERS AND METHOD OF MAKING

George E. Hulse, Newark, and Albert S. Matlack, Wilmington, Del., assignors to Hercules Powder Company, Wilmington, Del., a corporation of Delaware No Drawing. Application May 13, 1953
Serial No. 354,866

10 Claims. (Cl. 260—45.5)

This invention relates to new acrylonitrile copolymers and, more particularly, to acrylonitrile copolymerized with the polymer obtained by contacting an acrylamide with a strongly basic catalyst.

Polyacrylonitrile is a relatively high softening polymer from which can be prepared fibers that are strong and insensitive to water and other common organic solvents such as those employed by the dry cleaning trade. This inertness to chemical attack, while an advantage in the ordinary use of the polymer, is a disadvantage when colored products are desired. Various special techniques have been developed for dyeing polyacrylonitrile fibers such as the use of temperatures and pressures higher than those obtainable in conventional dyeing equipment or by using special mordants or dyeing assistants. In spite of all these developments, no process is presently available by which polyacrylonitrile fibers can be dyed in a full range of colors without special mordants at temperatures obtainable in conventional dyeing equipment. Numerous attempts have been made to enhance the dyeability of polyacrylonitrile fibers. Polyacrylonitrile has been mixed, before spinning, with other polymers that have an affinity for dyes, but the fibers from such mixtures often have a low softening point, and even more objectionable is the fact that they show segmentation into their individual components. Attempts have also been made to use copolymers of acrylonitrile with some other monomer whose polymer is susceptible to dyeing. For example, acrylonitrile has been copolymerized with small amounts of acrylamide, vinyl pyridine, etc., but the fibers produced from such copolymers either have a substantially lowered softening point or, if the softening point is maintained at an acceptable level, the polymer lacks a sufficient degree of dyeability. Attempts have also been made to polymerize acrylonitrile with an easily dyeable polymer, as, for example, polyacrylamide, and while there is some increase in dyeability, such polymers are still dyed only with difficulty.

Now, in accordance with this invention, it has been found that acrylonitrile may be copolymerized with the polymer produced when an acrylamide is contacted with a strongly basic catalyst to produce a copolymer that is dyed with surprising ease and does not suffer from the disadvantages of having a lowered softening point, loss in strength, or increased water sensitivity as do other copolymers of acrylonitrile.

The new copolymers of this invention may be defined as copolymers of acrylonitrile with base-catalyzed polymers of acrylamide or α-alkylacrylamides. By the term "base-catalyzed acrylamide polymer" as used in this specification and claims appended hereto is meant the polymer produced when an acrylamide having the formula

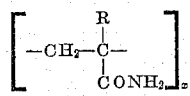

where R is hydrogen or alkyl, is contacted with a strongly basic catalyst. These polymers have the following general formula:

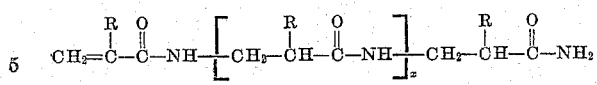

where $x$ is any positive integer of from 1 to 1000 or more and R may be hydrogen or alkyl, as distinguished from the polyacrylamide produced by the free radical catalyzed polymerization of acrylamide, which polymers have the general formula

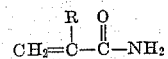

where R and $x$ have the designations set forth above.

The following examples will illustrate the preparation of the new acrylonitrile copolymers in accordance with this invention. All parts and percentages are by weight unless otherwise indicated.

*Example 1*

A base-catalyzed polymer of acrylamide was prepared by adding 400 parts of acrylamide to a boiling solution of 4.0 parts of sodium in 4000 parts of tert-butanol. A precipitate soon formed on the walls of the flask. When the precipitation was complete, the tert-butanol was decanted and the polymer was then dissolved in water and the resultant solution was neutralized with acetic acid. Evaporation of an aliquot of this solution gave a residue of polymer which absorbed 0.08% hydrogen on analytical hydrogenation. The specific viscosity of a 1% aqueous solution of the polymer was 0.103.

Twenty parts of the above 10% aqueous solution of base-catalyzed acrylamide polymer, 2.0 parts of acrylonitrile, 4.0 parts of a 2% aqueous solution of potassium persulfate, and 3.2 parts of a 1% aqueous solution of sodium bisulfite were mixed under nitrogen and allowed to stand for 16 hours at 25° C. The polymer which formed was removed by filtration, thoroughly washed with water, and then dried under reduced pressure at 60° C. It contained 5.78% oxygen and had a specific viscosity (1% solution in dimethylformamide) of 5.61. This amount of oxygen corresponds to a ratio of propionitrile to base-catalyzed acrylamide polymer units in the copolymer of 2.9 (i.e., 25% modification of polyacrylonitrile). The amount of copolymer obtained was equivalent to a 95% yield based on the acrylonitrile.

That this product was actually a copylmer and not just a mechanical mixture of polyacrylonitrile and base-catalyzed acrylamide polymer was shown by the difference in solubility. The base-catalyzed acrylamide polymer used was soluble in water and insoluble in a solution of polyacrylonitrile in dimethylformamide, whereas the above copolymer was completely soluble in dimethylformamide.

Fibers were prepared from this copolymer by dry-spinning a concentrated solution of the copolymer in dimethylformamide. After drying, the fibers were stretched to several times their initial length and oriented in hot water.

*Examples 2–6*

Copolymers of acrylonitrile and base-catalyzed acrylamide polymers were prepared using the procedure described in Example 1 except that the ratio of acrylonitrile to the base-catalyzed acrylamide polymer was varied. The base-catalyzed acrylamide polymers used in these examples were prepared essentially as described in the first paragraph of Example 1 above and all were water-soluble. The ratio of monomer to polymer used for the preparation of the copolymers in these examples is set forth in the following table along with the ratio of acrylonitrile to base-catalyzed acrylamide polymer in the final product, the percent yield based on acrylonitrile, the percent modification, and the specific viscosity.

| Example | Ratio of Acrylonitrile to Base-Catalyzed Acrylamide Polymer | | Percent Yield | Percent Modification | Specific Viscosity, 1% in Dimethylformamide |
|---|---|---|---|---|---|
| | Reacted | In Product | | | |
| 2 | 0.5 | 1.9 | 82 | 34 | 1.719 |
| 3 | 0.9 | 2.6 | 93 | 28 | |
| 4 | 2.0 | 4.0 | 93 | 20 | 2.576 |
| 5 | 2.4 | 6.6 | 94 | 13 | |
| 6 | 3.7 | 8.9 | 87 | 10 | 10.00 |

*Examples 7 and 8*

Copolymers of acrylonitrile and base-catalyzed acrylamide polymers were prepared exactly as described in Example 1 except that in Example 7 the amount of catalyst was decreased to ½ of that used in Example 1, and in Example 8 the amount of catalyst was decreased to ¼ of that used in Example 1. The copolymers so obtained had specific viscosities (1% dimethylformamide) of 8.984 and 10.63, respectively. The percent modification obtained in each case was approximately the same as in Example 1, i. e., about 25%.

To demonstrate the dyeability of the copolymers produced in accordance with this invention, portions of copolymers prepared as described in the above examples and containing varying amounts of base-catalyzed acrylamide polymer, i. e., of varying percent modifications, were dissolved in dimethylformamide and films were cast from the solutions. These films were then dyed with acid dyes, basic dyes, and direct dyes by immersing the films in a dye bath (1% solution of the dye in water) for 10 minutes at 85–90° C. At the end of this time, the film was removed and washed thoroughly in a stream of hot water. In the following table is set forth the degree to which the film was dyed in each case as compared to films, dyed in exactly the same manner, made from unmodified polyacrylonitrile, the commercial polyacrylonitrile known as "Orlon," and the commercial polyacrylonitrile known as "Acrilan."

the copolymers of this invention is not only outstandingly greater than that of unmodified polyacrylonitrile, but is also much greater than that of either of the commercial polyacrylonitriles.

Another advantage of the copolymers of this invention is that the molecular weight of the polymer is not greatly lowered by an increasing degree of modification. This is readily apparent from a comparison of the specific viscosities of the various copolymers shown in the foregoing tables.

The base-catalyzed acrylamide polymers which are copolymerized with acrylonitrile in accordance with this invention are prepared by contacting an acrylamide with a strongly basic catalyst under substantially anhydrous conditions. Acrylamides which can be copolymerized to produce the base-catalyzed acrylamide polymers suitable for copolymerization with acrylonitrile in accordance with this invention have the general formula

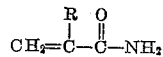

where R may be hydrogen or alkyl. Exemplary of such acrylamides are acrylamide, methacrylamide, ethacrylamide, etc. Any strongly basic catalyst having a basic strength that is at least as strong as that of potassium hydroxide may be used to catalyze the polymerization of the acrylamide, as, for example, the alkali metal hydroxides such as sodium and potassium hydroxide, and quaternary ammonium hydroxides such as benzyltrimethylammonium hydroxide; the alkali metal alkoxides such as sodium methoxide, sodium ethoxide, sodium tert-butoxide, etc., and the corresponding potassium alkoxides; the alkali metal amides such as sodamide, potassium amide, etc., alkali metal hydrides such as sodium hydride, etc.; and the alkali metals themselves such as sodium, potassium, etc. As already pointed out, the polymerization of the acrylamide should be carried out under substantially anhydrous conditions. This may be done by either a bulk polymerization system or in solution in some nonaqueous solvent. Solution polymerization is frequently desirable since the temperature, molecular weight, etc., are more easily controlled in such a process. For example, lower molecular weight polymers are obtained when a dilute solution of the monomer is polymerized. Suitable inert organic diluents which may be used are the hydrocarbon solvents such as hexane,

| | Percent Modification | Specific Viscosity, 1% in Dimethylformamide | Dye Absorption | | | | | |
|---|---|---|---|---|---|---|---|---|
| | | | Acid Dyes | | Basic Dye, Malachite Green | Direct Dyes | | |
| | | | Orange II | Fast Wool Yellow 3GL | | Pontamine Sky Blue FF | Eastman Blue BNN | Eastman Blue GLT |
| Unmodified Polyacrylonitrile | | 3.98 | N | N | L | N | F | F |
| Copolymer of Acrylonitrile and Base-Catalyzed Acrylamide Polymer | 25 | 5.607 | M | M | M | L | L | H |
| Do | 13 | | F | L | M | N | N | M |
| Do | 16 | | M | M | MH | M | LM | MH |
| Orlon | | 6.74 | F | N | L | M | L | M |
| Acrilan | | 2.777 | F | F | M | F | L | L |

N=none; F=faint; L=light; M=moderate; H=heavy.

The above test for dyeability represents a severe test, for, as is well-known, the amount of dye absorbed is related to the surface area. Thus, films are not as readily dyed as fibers and a color listed in the above table as "light" would, therefore, be "moderate" to "heavy" when applied to a fabric. Some dyes are, of course, more easily absorbed than others and as may be seen in the above table, malachite green is absorbed even by unmodified polyacrylonitrile to some extent. The differences in dye susceptibility are very noticeable with the more difficultly absorbed dyes. The dye susceptibility of octane, benzene, etc., tertiary alcohols such as tert-butanol, tert-amyl alcohol, etc.; ethers such as dioxane, dibutyl ether, etc.; and basic solvents such as pyridine, quinoline, etc. The temperature at which this polymerization is carried out will depend upon the monomer being polymerized, the activity of the catalyst, etc. In general, a temperature within the range of 25–200° C. is suitable, and preferably a temperature within the range of 80–110° C. will be used. The method by which the polymer is separated will, of course, depend upon the process used in obtaining it. If an inert organic diluent was used in which the polymer is insoluble, it may readily be separated by filtration, centrifugation, etc.

The properties of the base-catalyzed acrylamide polymers prepared as described above will, of course, depend upon the acrylamide that is being polymerized and the molecular weight of the polymer. By varying the reaction conditions, polymers of different molecular weights can be obtained, starting with the same monomer. For example, the polymer obtained by the base-catalyzed polymerization of acrylamide will be soluble in water if it has a relatively low molecular weight, but will be insoluble in water if it has a high molecular weight. In general, the polymers used for copolymerization with acrylonitrile in accordance with this invention will have relatively low molecular weights and usually will be those that are water-soluble. As previously set forth, $x$ in the above formula for the polymer may be 1 to 1000 or more, but will preferably be, for the purpose of this invention, within the range of from 1 to 300 and more preferably from 5 to 50.

The copolymerization of the acrylonitrile with the base-catalyzed acrylamide polymer is, in general, carried out in an aqueous system with a free radical-producing catalyst. The copolymerization reaction may be carried out in water alone or in mixtures of water with water-soluble organic solvents, as, for example, aqueous acetone, etc. If desired, emulsifying agents may be added to distribute the reagents uniformly throughout the medium, and particularly in cases where the concentration of reagents exceeds their solubility in the reaction medium. Any of the usual emulsifying agents used for polymerization reactions may be added, as, for example, the alkali metal salts of alkyl acid sulfates of aromatic sulfonic acids, of sulfosuccinic esters, and of long chain fatty acids, etc. Any of the well-known free radical polymerization catalysts may be used to bring about the copolymerization reaction. Exemplary of suitable catalysts are the persulfates such as potassium persulfate, the alkali metal perborates, hydrogen peroxide, organic peroxides such as benzoyl peroxide, acetyl peroxide, lauryl peroxide, hydroperoxides such as tert-butyl hydroperoxide, cumene hydroperoxide, etc. Other free radical-type of catalysts such as azines, azo catalysts such as azobis(isobutyronitrile), etc., may also be used. If desired, an activator may be used with the catalyst, as, for example, sodium bisulfite with potassium persulfate, etc. The copolymerization reaction may be carried out at any of the conventional polymerization temperatures, usually within the range of from about 0° to about 100° C., but temperatures of from about 20° to about 50° C. are usually adequate.

As may be seen from the foregoing examples, when even a small amount of the base-catalyzed acrylamide polymer is incorporated in the polyacrylonitrile, the dye susceptibility of the polymer is enhanced. In general, it is desirable to modify the polyacrylonitrile with from 1 to 50% of the base-catalyzed acrylamide polymer, and preferably from 5 to 40%, and more preferably from 10 to 25%. The amount of the base-catalyzed acrylamide polymer which is incorporated in the polyacrylonitrile can be controlled by varying the ratio of acrylonitrile to the base-catalyzed acrylamide polymer in the copolymerization reaction medium. The amount of the base-catalyzed acrylamide polymer to be added will generally be within the range of from about 3 to about 75%, and preferably will be within the range of about 15 to about 50%. As may be seen from the foregoing examples, when the base-catalyzed acrylamide polymer was present to the extent of at least 30% of the total charge, the copolymer so produced contained 13% or above of the base-catalyzed acrylamide polymer.

It will be obvious that many variations can be made in the preparation of the new copolymers of this invention. For example, in addition to the incorporation of the base-catalyzed acrylamide polymer, other monomers that may enhance the dye susceptibility even further or that may increase the softening temperature of the ultimate copolymer may be incorporated, as, for example, vinyl monomers such as vinyl acetate, acrylic acid, and other ethylenically unsaturated monomers such as methacrylic acid, fumaric esters, isobutylene, etc. Such additional monomers should, of course, be kept within a very low percentage of the total charge, as, for example from about 1 to about 10%.

The new copolymers of this invention are particularly useful in the preparation of synthetic fibers. They have the strength and water resistance of unmodified polyacrylonitrile and, in addition, have excellent dyeing properties without any substantial lowering of the softening point.

What we claim and desire to protect by Letters Patent is:

1. A copolymer of acrylonitrile and a polymer having the general formula

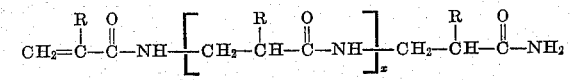

where $x$ is any positive integer from 1 to 1000 and R is selected from the group consisting of hydrogen and alkyl.

2. A fiber of the product of claim 1.
3. A copolymer of acrylonitrile and an acrylamide polymer having the general formula

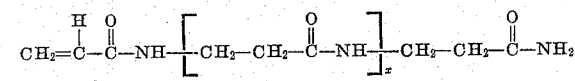

where $x$ is any positive integer from 1 to 1000.

4. The product of claim 3 wherein the amount of acrylamide polymer present in the copolymer is from about 1% to about 50% by weight.

5. The product of claim 3 wherein the amount of acrylamide polymer present in the copolymer is from about 5% to about 40% by weight.

6. The product of claim 3 wherein the amount of acrylamide polymer present in the copolymer is from about 10% to about 25%.

7. A fiber of the product of claim 3.
8. The process of preparing a copolymer of acrylonitrile and a polymer having the general formula

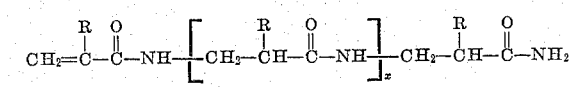

where $x$ is any positive integer from 1 to 1000 and R is selected from the group consisting of hydrogen and alkyl, which comprises copolymerizing from about 25 to about 97 parts of acrylonitrile with from about 3 to about 75 parts of said polymer in the presence of a free radical polymerization catalyst.

9. The process of preparing a copolymer of acrylonitrile and an acrylamide polymer having the general formula

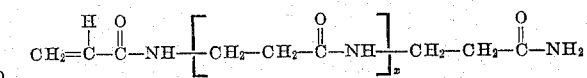

where $x$ is any positive integer from 1 to 1000, which comprises copolymerizing from about 25 to about 97 parts of acrylonitrile with from about 3 to about 75 parts of said acrylamide polymer in the presence of a free radical polymerization catalyst.

10. The process of preparing a copolymer of acrylonitrile and an acrylamide polymer having the general formula

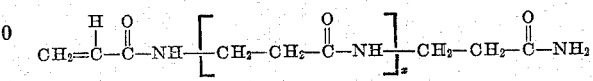

where $x$ is any positive integer from 1 to 1000, which comprises copolymerizing from about 50 to about 85 parts of acrylonitrile with from about 15 to about 50 parts of said acrylamide polymer in the presence of a free radical polymerization catalyst.

References Cited in the file of this patent

UNITED STATES PATENTS

| | | |
|---|---|---|
| 2,458,355 | Dickey | Jan. 4, 1949 |
| 2,594,560 | Howard | Apr. 29, 1952 |
| 2,608,555 | Bullitt | Aug. 26, 1952 |
| 2,620,324 | Coover et al. | Dec. 2, 1952 |
| 2,649,434 | Coover et al. | Aug. 18, 1953 |
| 2,657,191 | Coover et al. | Oct. 27, 1953 |
| 2,749,331 | Breslow | June 5, 1956 |